United States Patent
Pohl et al.

(10) Patent No.: US 6,463,736 B1
(45) Date of Patent: Oct. 15, 2002

(54) ADJUSTMENT AND DAMPING DEVICE

(75) Inventors: Andreas Pohl, Gross-Umstadt (DE); Horst Rosenfeldt, Gross-Zimmern (DE); Eckhard Wendt, Leverkusen (DE); Klaus Büsing, Köln (DE)

(73) Assignees: Bayer Aktiengesellschaft, Leverkusen (DE); Carl Schenck AG, Darmstadt (DE)

(*) Notice: Subject to any disclaimer, the term of this patent is extended or adjusted under 35 U.S.C. 154(b) by 0 days.

(21) Appl. No.: 09/402,145

(22) PCT Filed: Apr. 15, 1998

(86) PCT No.: PCT/EP98/02207

§ 371 (c)(1),
(2), (4) Date: Feb. 28, 2000

(87) PCT Pub. No.: WO98/49461

PCT Pub. Date: Nov. 5, 1998

(30) Foreign Application Priority Data

Apr. 26, 1997 (DE) .......................................... 197 17 693

(51) Int. Cl.⁷ ........................ F16D 31/00; F15B 13/044
(52) U.S. Cl. .......................................... 60/326; 91/459
(58) Field of Search .................. 91/47, 459; 60/326

(56) References Cited

U.S. PATENT DOCUMENTS

| | | | |
|---|---|---|---|
| 3,599,428 A | * | 8/1971 | Chaney et al. ............. 60/326 |
| 4,668,417 A | | 5/1987 | Goossens et al. |
| 4,702,855 A | | 10/1987 | Goossens et al. |
| 4,840,112 A | * | 6/1989 | Bhandra et al. ........... 91/459 |
| 4,893,800 A | * | 1/1990 | Tabata ................... 267/140.1 |
| 5,174,552 A | | 12/1992 | Hodgson et al. |
| 5,259,487 A | | 11/1993 | Petek |
| 5,268,118 A | | 12/1993 | Bloodworth et al. |
| 5,452,745 A | | 9/1995 | Kordonsky et al. |
| 5,462,687 A | | 10/1995 | Podszun et al. |
| 5,496,483 A | | 3/1996 | Herrmann et al. |
| 5,503,763 A | | 4/1996 | Podszun et al. |
| 6,116,144 A | * | 9/2000 | Rosenfeldt et al. ........... 91/459 |

FOREIGN PATENT DOCUMENTS

| | | |
|---|---|---|
| DE | 39 22 930 A1 | 1/1991 |
| GB | 2 218 758 A | 11/1989 |
| GB | 2 267 947 A | 12/1993 |
| WO | 91/15687 A | 10/1991 |
| WO | WO 91 15687 A | 10/1991 |
| WO | WO 92 02107 A | 2/1992 |
| WO | 92/02107 A | 2/1992 |

OTHER PUBLICATIONS

SAE 931324 of the Proceedings of the 1993 Noise and Vibration Conference, Travers City, Michigan, May 10th to 13th, 1993.

* cited by examiner

Primary Examiner—John E. Ryznic
(74) Attorney, Agent, or Firm—Norris McLaughlin & Marcus

(57) ABSTRACT

The invention relates to a controllable adjustment and damping device comprising at least one pressure chamber (4) filled with hydraulic fluid, a fluid container (11), a pump (5) connecting the pressure chamber to the fluid container, a compensating volume (8) and a return line (13) with a passthrough valve (7). An electro-rheological fluid or magneto-rheological fluid is used as a hydraulic fluid (6) which exerts pressure upon a piston (3) that juts out into the pressure chamber or on a membrane (17), the intensity thereof being controlled by the passthrough valve.

7 Claims, 4 Drawing Sheets

ADJUSTMENT AND DAMPING DEVICE

The invention relates to a controllable actuating and damping device comprising at least a pressure chamber filled with a hydraulic fluid, a reserve of fluid, a pump which connects the pressure chamber and the reserve of fluid, a compensating volume and a return passage with a passthrough valve in which an electrorheological fluid or magnetorheological fluid is used as the hydraulic fluid, exerting a pressure on a piston projecting into the pressure chamber or on a diaphragm, the intensity of which can be controlled by means of the passthrough valve.

The invention furthermore relates to an energy converter for converting mechanical vibration energy into electrical energy.

The invention is directed, in particular, towards an electrorheological actuator for improving the control of couplings and gearboxes, primarily viscous couplings or multiplate clutches, especially for use in motor-vehicle construction.

The prior art has disclosed various forms of coupling which operate using an electrorheological fluid as hydraulic fluid (see, for example, DE 39 22 930 and GB 2 218 758). In electrorheological couplings, the electrorheological fluid (referred to below as ERF for short) is used directly for torque transmission between the surfaces in motion relative to one another, e.g. the clutch discs. A major disadvantage of such a coupling construction is that very large surfaces are required to transmit high torques since the available electrorheological fluids can transmit only about 10 kPa of shear stress at the maximum. For a simple disc clutch, which is intended to transmit a torque of only about 20 Nm for example, a force-transmitting area of at least 305 cm$^2$ would therefore be necessary. However, this large area requires a large overall volume of the clutch. Another disadvantage is the pronounced heating of the electrorheological fluid. This results in a further increase in the energy required to control the clutch. For this reason, couplings based on electrorheological fluids have hitherto only been developed as prototypes for the transmission of low torques.

Said type of clutch is described specifically for use in motor-vehicle construction, for decoupling auxiliary units, e.g. for the generator or fan. The very high differential speeds may occur in the region of the clutch discs due to the changes in engine speed, a high torque occurs even in the inactive state of the electrorheological fluid, due to its basic viscosity. This limits the possibilities for controlling the clutch.

One object of the invention is to develop an improved actuator for couplings based on electroviscous fluids as hydraulic fluid which does not have the abovementioned disadvantages. In particular, it should be possible to provide an actuator which allows continuous adjustment, e.g. of multi-plate clutches.

Actuators using hydraulic fluids are known from motor-vehicle construction. The so-called ELDRO devices may be mentioned here by way of example (EMG, AEG). With this type of actuator, a piston with an actuating rod is moved between two end positions by means of the pressure of a hydraulic fluid in a pressure chamber connected to a pump. In this arrangement, the pressure in the pressure chamber is maintained by a hydraulic pump. An actuator of this kind has the disadvantage that the piston can only be moved into two positions and that continuous adjustment of the piston travel is possible only with high outlay on construction.

It is a further object of the invention to develop an active damper which is capable of active anti-phase compensation of shocks or other mechanical vibrations.

Shock absorbers based on the action of electrorheological fluids are described in many places in the patent literature. One example that may be referred to is U.S. Pat. No. 5,259,487. In the case of the shock absorber described there, the electrorheological fluid is forced through an electrode gap by means of a piston. The pressure drop and hence the damper force is infinitely variable from a low to a maximum value using the electrorheological effect in the electrode gap.

In principle, it is possible by means of electrorheological shock absorbers to obtain semi-active suspensions whose damping can be varied within short time periods. In some cases, the switching time is less than 10 msec. Active influencing of the shock-absorber piston is not possible with the shock absorber mentioned.

The prior art has also disclosed passive engine mounts based on electrorheological fluids as the hydraulic fluid. See, for example, publication SAE 931324 of the Proceedings of the 1993 Noise and Vibration Conference, Travers City, Mich., 10th to 13th May 1993.

The mount mentioned is an adaptive mount which can be switched backwards and forwards between various states. These so-called ERF mounts do not have any discernible technical advantage over the conventional hydraulic mounts known from the prior art. On the contrary, the active mounts currently required for use as engine mounts are those which can, for example, completely compensate for engine vibrations, such as the second harmonic of the engine speed in the case of four-cylinder internal combustion engines.

An engine mount that operates in an optimum manner must furthermore fulfil at least two functions. The natural frequencies of the engine/body caused by load changes or excitation by the roadway must be damped in an optimum manner in a frequency range typically of about 12 Hz. Engine vibrations in the higher-frequency range of about 20 to 100 Hz must be isolated in an optimum manner from the chassis and, in particular, the passenger cell. Particularly in the case of diesel engines, there is a requirement that vibrations in the idling range (diesel clatter) at about 30 Hz should be suppressed.

It is another object of the invention to use the damping property of the actuator in such a way that it is possible with a fundamentally identical construction not only to accept and eliminate the mechanical vibrations, e.g. in the case of use as a passive shock absorber, but, where required, to convert them into electrical energy.

The object is achieved according to the invention by a controllable actuating and damping device which is the subject matter of the invention and comprises at least a pressure chamber with a piston, or a diaphragm, a reserve of fluid containing a hydraulic fluid, a pump which connects the pressure chamber and the reserve of fluid, a compensating volume, a return passage with a valve, and an enclosing housing, and is characterized in that the hydraulic fluid is an electrorheological fluid or magnetorheological fluid which is pumped by means of the pump, flows from the reserve of fluid into the pressure chamber and, from there, flows via the valve back into the reserve of fluid or else in the opposite direction, in that the pressure of the hydraulic fluid in the pressure chamber acts on the piston or the diaphragm, and in that the valve is embodied as an ERF or MRF valve by means of which the flow of the hydraulic fluid through the return passage is controlled, thereby allowing the pressure of the hydraulic fluid on the piston or diaphragm to be adjusted.

The term electrorheological fluids is intended to indicate dispersions of finely divided hydrophilic particles in hydrophobic, electrically non-conductive oils (generally colloidal suspensions of electrically polarizable, non-conductive particles) which, under the action of an electric field of sufficiently high electric field strength, rapidly and reversibly change their yield strength or their shear modulus, under certain circumstances over several orders of magnitude. In the process, the ERF may change from the low-viscosity, via the plastic, to the solid state of aggregation.

Examples of suitable electrorheological fluids are mentioned in German Offenlegungsschriften (German Published Specifications) DE 35 17 281 A 1, DE 35 36 934 A 1, DE 39 41 232 A 1, DE 40 26 881 A 1, DE 41 31 142 A 1 and DE 41 19 670 A 1.

Both direct-voltage and alternating-voltage fields are used to excite the electrorheological fluids. The electric power required here is comparatively low.

To control the flow behaviour of the electrorheological fluid in the coupling elements, use can be made of a sensor such as that described in German Offenlegungsschrift (German Published Specification) DE 36 09 861 A 1.

The term magnetorheological fluids (MRF) refers to suspensions of finely divided magnetic particles with a particle size of a few pm or a few nm in suitable liquids such as mineral or silicone oils, the solids content of the suspension typically being about 20 to 60% by volume. The flow resistance of magnetorheological fluids changes under the influence of a strong magnetic field as a function of the magnetic field strength. Depending on the type, they reach shear stress values of up to 100 kPa.

According to the invention, the electrorheological or magnetorheological fluid is thus not used for torque transmission but as a control medium. Where the controllable actuating device is used for a clutch, the distance between the discs of the clutch is controlled in a clearly defined manner by means of the ERF of the actuating device. It is therefore possible, with the device according to the invention, to control both the output speed and the torque of such a clutch within wide limits, as desired for driving auxiliary units according to requirements, e.g. in motor vehicles.

The use of the device according to the invention as an actuator is directed, in particular, towards low-frequency movements with a frequency of less than or equal to 1 Hz at amplitudes of preferably 1 to 30 mm.

Like a known hydraulic mount, an active engine mount based on the actuating and damping device according to the invention comprises a fluid-filled space which is. closed off on one side by a hard-rubber body. The pump element is intended to allow a continuous volume flow between the pressure chamber and the reserve of fluid. The desired damping, is set by means of the return passage or the ERF or MRF valve situated in the return passage. Compared with conventional known mounts, which are designed for a particular type of engine or car, there is the possibility with a mount based on the actuating and damping device according to the invention to set suitable damping with a single type of mount, irrespective of the particular type of engine or car. A further advantage of the invention is that the damping can be adjusted actively to different vibratory excitation or load changes.

The use of the device according to the invention as an active mount is directed, in particular, at vibrations with a frequency of 200 to 100 Hz and with an amplitude of 0.01 to 0.5 mm.

In particular, it is possible, for the purpose of eliminating relatively high mechanical frequencies by anti-phase activation of the electrorheological fluid or magnetorheological fluid in relation to the engine vibration to excite a vibration of the hard-rubber mounting which fully compensates for the vibration of, for example, the engine.

Another object of the invention is the use of the device according to the invention as an active damper for damping mechanical vibrations.

In this context, the pressure chamber of the device is subjected to pressure in such a way that a pressure shock via the piston counteracts a shock on the actuating rod. The acceleration of the actuating rod can be detected by sensors which are known in principle. The signal obtained can be used as an actuating signal for activating the ERF in th e electrode gap.

The use of the device according to the invention as an active damper is directed, in particular, at vibrations in a range of 1 to 20 Hz at an amplitude of 1 to 30 mm.

It has furthermore been found that it is a simple matter to vary the construction of the actuating and damping device according to the invention in such a way that it not only converts vibration energy into heat when damping mechanical vibrations but renders the vibration energy usable by converting it into electrical energy. In the simplest case, a generator unit is provided in the device instead of the pump connecting the pressure chamber and the reserve of fluid, this generator unit being capable of transmitting mechanical vibrations transmitted to the pressure chamber by the piston, via the drive gear and the shaft of the generator unit, to the generator, by means of which the rotary motion of the shaft is converted into electrical energy.

Thus, the invention also relates to an energy converter for converting mechanical vibration energy into electrical energy, comprising at least a pressure chamber with a piston, or a diaphragm, a reserve of fluid containing a hydraulic fluid, a generator unit which connects the pressure chamber and the reserve of fluid with a drive gear, flow passage, shaft and generator, a compensating volume, a return passage, a valve, and an enclosing housing, characterized in that the hydraulic fluid is an electrorheological fluid or magnetorheological fluid, which is driven by the compressive or tensile force of the piston or the diaphragm from the pressure chamber, through the flow passage of the generator unit, into the reserve of fluid or in the opposite direction, in that the hydraulic fluid flowing through the flow passage drives the drive gear of the generator unit, and generates current in the generator, and in that the valve is embodied as an ERF or MRF valve in which the flow of the hydraulic fluid through the return passage is controlled.

As an alternative, the energy converter according to the invention can simply be used as an actuating and damping device if a drive, e.g. an electric motor, is connected to the shaft of the generator unit instead of the generator. In this case, the drive gear, the shaft and the motor act as a pump for the hydraulic fluid.

The invention also relates to the use of the energy converter of the invention for the purpose of generating current from low-frequency mechanical vibrations, in particular with a frequency of about 0.5 to 20 Hz, in particular at amplitudes of 1 to 30 mm.

The invention is explained in greater detail below by way of example with reference to the figures, in which.

EXAMPLES

Example 1

Figure 1:
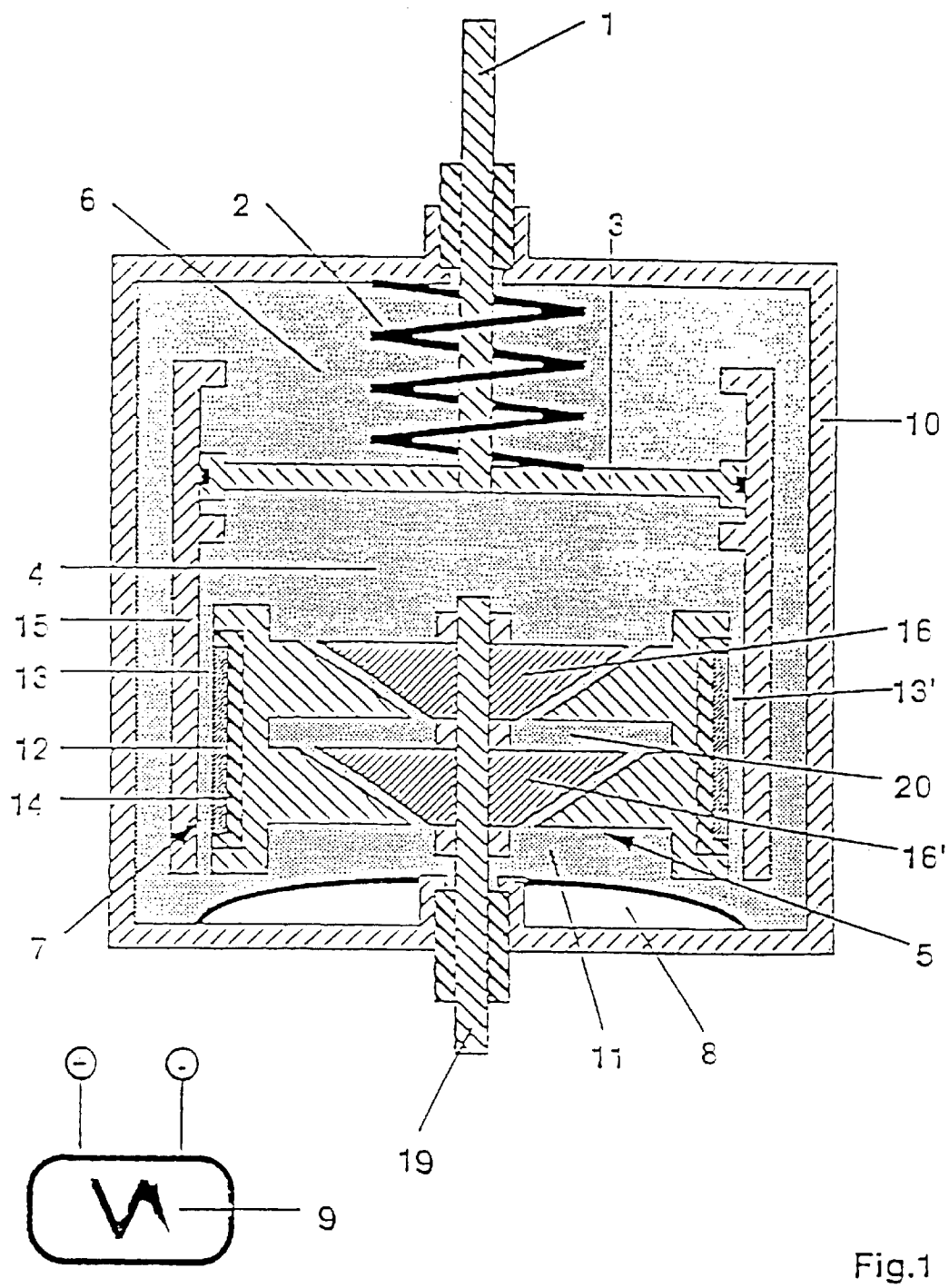
FIG. 1 shows a cross section through an actuating and damping device according to the invention with a piston as force transmitter.

An actuator whose operation is based on an ERF as hydraulic fluid and is used for adjusting a clutch is constructed as follows:

An actuating rod 1, which adjusts the distance between the plates or discs of a clutch (not shown), is connected to the piston. A volume flow dependent on rotational speed from the reserve of fluid 11 into the pressure chamber 4 is produced by means of a hydraulic pump 5, which is here designed as a two-stage vane-cell pump. The pump 5 is driven by the V-belt of an internal combustion engine via a V-belt pulley (not shown). The pressure chamber 4 is closed off by the piston 3, which maintains a defined reaction force by means of a return spring 2.

The electrorheological hydraulic fluid 6 flows back through return passages 13, 13' which contain an electrorheological valve 7 into the reserve of fluid 11 and to the inlet side of the pump 5. The valve 7 is designed in such a way that the piston 3 remains in its initial position even when the pump 5 is at a high rotational speed and hence at a high volume flow. The electrorheological valve 7 is formed by the electrically insulated capacitor plate 12, which is embedded in the insulator 14, and the inner housing 15, which acts as a counterelectrode. The capacitor plate 12 is connected to the live line of an external high-voltage supply 9. All the other housing components are connected to earth potential.

If a high voltage is applied to the electrorheological valve 7, the strong electric field in the return passage 13 increases the flow resistance of the ERF, with the result that the pressure in the pressure chamber 4 rises. The piston 3 is extended to an extent dependent on the ratio of the pressure force to the spring force of the return spring 2 and, in the process, displaces the actuating rod 1, with the result that the distance between the discs or plates of the clutch is adjusted in an infinitely variable manner. The compensating volume 8 is gas-filled and is sealed off from the reserve of fluid 11 by a diaphragm, and it serves to compensate for the volume of the extending or retracting actuating rod.

Example 2

Figure 2:
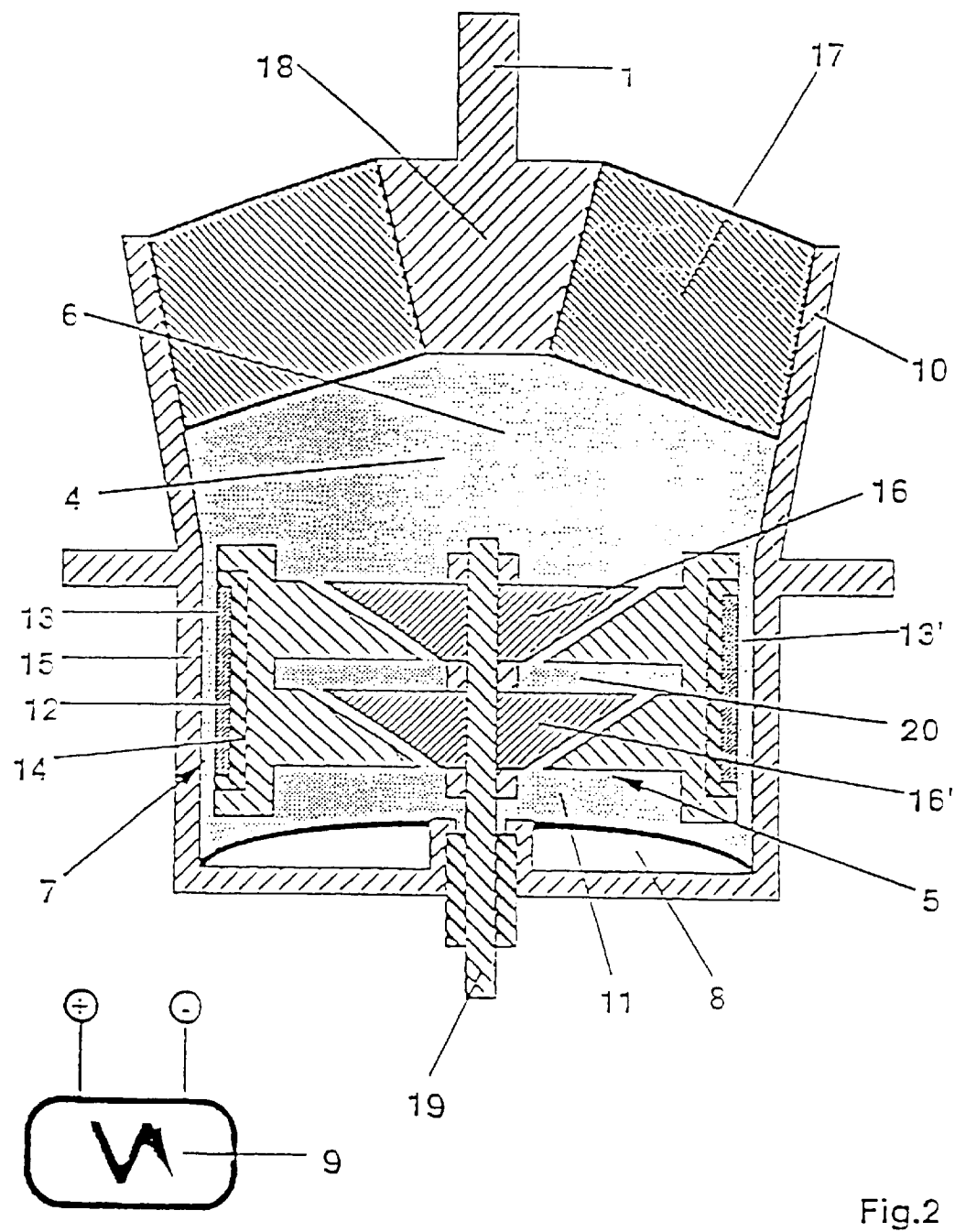
FIG. 2 shows a cross section through an embodiment of the actuating and damping device according to the invention with a diaphragm as force transmitter.

A variant of the actuating and damping device described in Example 1, for actively damping engine vibrations of vehicles, is shown in the sectional representation in FIG. 2. The construction is identical in significant parts to that in FIG. 1. A rubber diaphragm 17, which is connected to the actuating rod 1 via the block 18, is provided here to transmit force between the actuator and, for example, an engine to be damped (not shown), instead of the combination of piston 3 with return spring 2. The engine is connected directly to the actuating rod 1. The housing 15 is connected to the chassis (not shown in FIG. 2) of the vehicle. If the valve 7 in this device is closed by applying a voltage, the pressure in the pressure chamber 4 will stretch the diaphragm 17, thereby extending the actuating rod 1 and actively counteracting a mechanical vibration. The damping can be adapted to the vibration frequency by means of ERF valve 7, e.g. by detecting the vibrations using suitable sensors and antiphase activation of the valve 7.

Example 3

Figure 3:
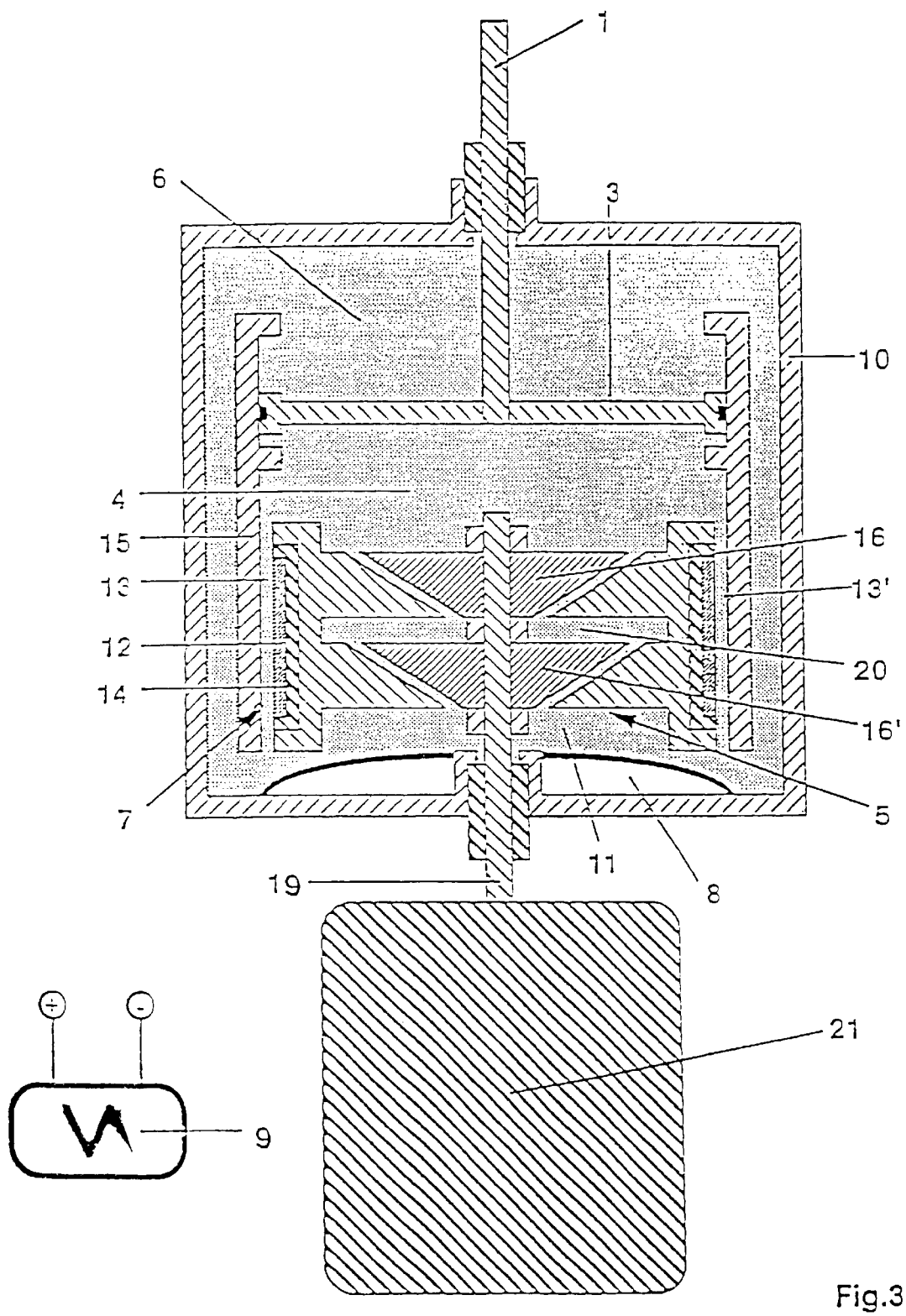
FIG. 3 shows a cross section through an energy converter according to the invention for converting mechanical vibration energy into electrical energy.

The construction shown in Example 1 is modified for use of the device as an energy converter in accordance with FIG. 3 such that a generator is connected to the impeller 16 and the shaft 19 instead of an engine or a V-belt drive. The device is then operated in such a way that vibrations which are transmitted to the pressure chamber 4 by the actuating rod 1 and the piston 3, which, where the device is used as a shock absorber, are connected to an engine for example. When the return passages 13, 13' are shut off, the hydraulic fluid is forced through flow passage 20 and the impeller 16 is driven. The rotary motion of the impeller 16 is transmitted by the shaft 19 to the generator 21, which uses it to generate current. As illustrated in Example 2, a diaphragm 17 can be provided for force transmission associated with the mechanical vibrations instead of the combination of piston 3 and return spring 2.

Example 4

Figure 4:
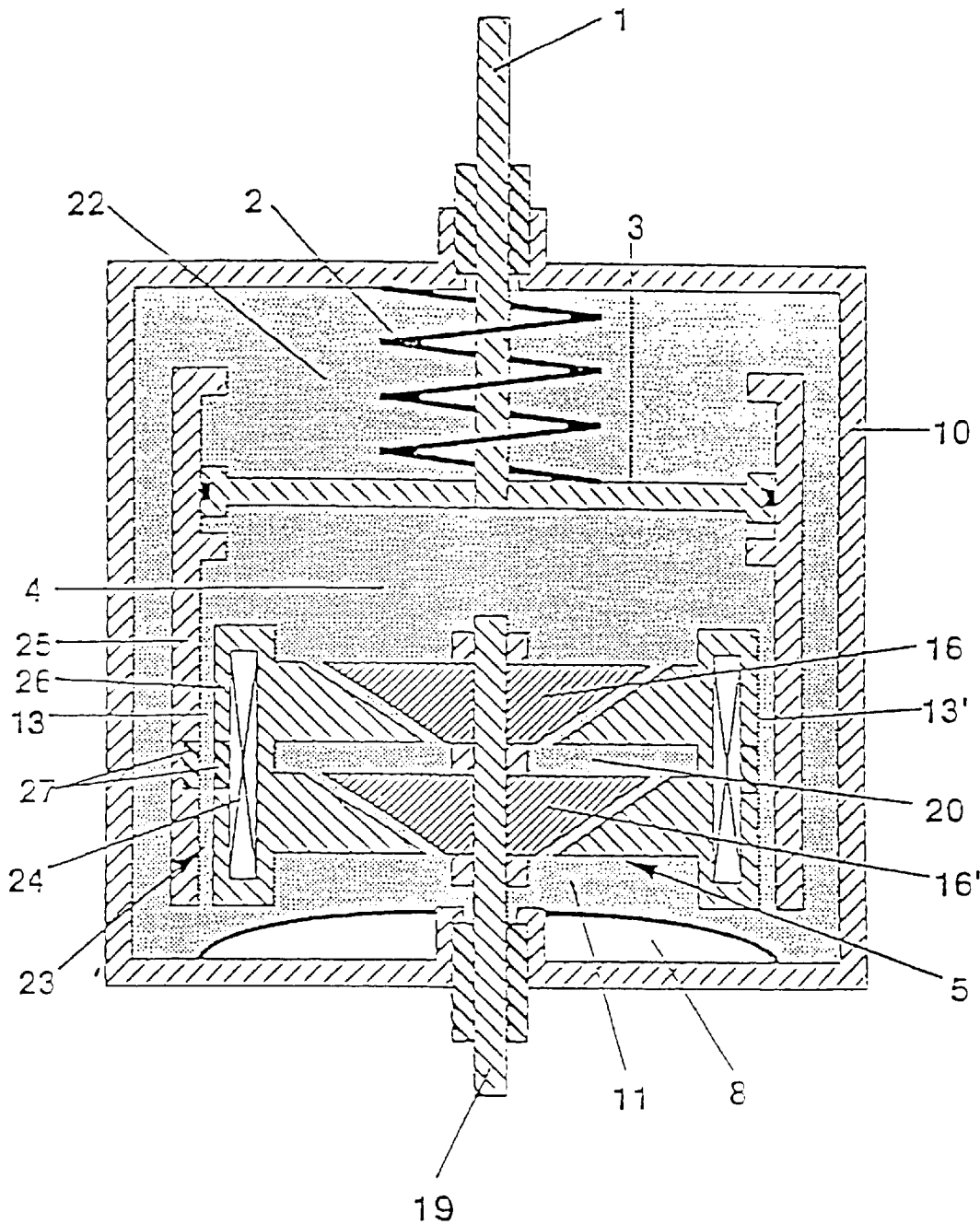
FIG. 4 shows a cross section through an embodiment in accordance with FIG. 1 with an MRF valve.

A variant of the actuating and damping device according to the invention, as shown in Example 1, is shown in the sectional representation in FIG. 4. Here, the MRF 22 is used instead of the ERF. Accordingly, the ERF valve is replaced by the MRF valve 23. The flow resistance of the MRF is controlled by means of the variable magnetic field strength in the return passages 13 and 13'. As a result, the operation of the actuating and damping device is fundamentally the same as that in Example 1.

The MRF valve comprises the coil former 24, the iron parts 25 and 26 forming the magnetic high, the MRF return passages 13 and 13' and the magnetic insulators 27. The electric control current of the coil in the coil former 24 produces a magnetic field which is passed through the iron parts 25 and 26 forming the yoke. This gives rise to a magnetic field of controllable magnetic-field strength in the return passages 13 and 13', the said magnetic field acting perpendicular to the direction of flow of the MRF. The magnetic insulators 27 are used to prevent a magnetic short circuit in the yoke-forming iron part 26 and to obtain as homogeneous a magnetic field as possible.

What is claimed is:

1. Controllable actuating and damping device comprising, within a single housing, at least a pressure chamber with a piston, or a diaphragm, a reserve of fluid containing a hydraulic fluid, a pump an optional compensating volume, a return passage with a valve, wherein the hydraulic fluid is an electrorheological fluid or magnetorheological fluid which the pump is disposed to pump from the reserve of fluid into the pressure chamber and, from there, via the valve, back into the reserve of fluid or in the opposite direction, and wherein the pressure of the hydraulic fluid in the pressure chamber acts on the piston or the diaphragm, and wherein the valve is adapted to control flow resistance of the hydraulic fluid in the return passage.

2. An active damper for damping mechanical vibrations, or a coupling, comprising the device of claim 1.

3. An active mount for machines and engines comprising the controllable and damping device of claim 1.

4. A method for damping mechanical vibrations which comprises damping said vibrations with a controllable damping device according to claim 1.

5. A method for actuating a clutch, which comprises actuating said clutch with a controllable actuator according to claim 1.

6. Energy converter for converting mechanical vibration energy into electrical energy, comprising, within a single housing, at least a pressure chamber with a piston, or a diaphragm, a reserve of fluid containing a hydraulic fluid, a generator unit which connects the pressure chamber and the reserve of fluid, with a drive gear, flow passage, shaft and generator, a compensating volume, a return passage with a valve, wherein the hydraulic fluid is an ERF or MRF, which in operation is driven by the compressive or tensile force of the piston or the diaphragm from the pressure chamber, through the generator unit, into the reserve of fluid or in the opposite direction, and wherein the hydraulic fluid flowing through the flow passage drives the generator, which generates current, and wherein the valve controls the flow resistance of the hydraulic fluid in the return passage.

7. A method for generating current from low-frequency mechanical vibrations which comprises converting said vibrations into electrical energy with the energy converter of claim 6.

* * * * *